United States Patent Office 3,666,426
Patented May 30, 1972

3,666,426
CONTINUOUS PROCESS FOR THE PRODUCTION OF HIGH-DENSITY THORIA
Winston Burkhardt, Karthaus, Pa., assignor to the United States of America as represented by the United States Atomic Energy Commission
No Drawing. Filed May 1, 1969, Ser. No. 821,110
Int. Cl. C01f 15/00
U.S. Cl. 23—328          1 Claim

ABSTRACT OF THE DISCLOSURE

This invention relates to a method for preparing thoria from an aqueous solution of thorium nitrate which comprises mixing said solution with an aqueous basic solution of ammonia continuously at a temperature in the range 180-200° F. under such conditions that the pH of the resulting slurry as would be measured at 25° C. is at a value in the range 5.0-6.5, and then filtering the resultant precipitate.

BACKGROUND OF THE INVENTION

The invention described herein was made in the course of, or under, a contract with the U.S. Atomic Energy Commission. It relates to a method for the preparation of thoria particles from an aqueous solution of thorium nitrate. More particularly, it relates to a method for converting an aqueous solution of thorium nitrate into a filterable precipitate which can, in turn, be converted into either (1) gel fragments of thoria suitable for calcination and sintering to a product suitable for vibratory compaction or (2) a powder metallurgical grade thoria powder suitable for preparation of high density thoria compacts or reduction to metal.

The principal utility of the process of this invention is concerned with the production of extremely high density thoria particles which, when mixed over a suitable range of particle sizes, can be packed to densities of 58 to 80 percent of the theoretical density of thoria, $ThO_2$, as desired.

One of the principal sources for the large-scale production of fissile uranium-233 comes from the neutron irradiation of vibratorily compacted masses of extremely dense (i.e., in excess of 98 percent) particles of thoria having a pack density of at least 72 percent of the theoretical density of thoria. From nuclear considerations, it would be most desirable to irradiate thoria masses having a maximum bulk density approaching the theoretical density of thoria. However, subsequent chemical processing considerations involving the separation of thorium from uranium-233 require that the irradiated thoria masses be readily dissolvable in aqueous acidic media. Balancing, therefore, neutron economy considerations against chemical processing requirements, it has been determined that efficient and economic production of uranium-233 can be accomplished by the irradiation of thoria masses having a pack density at least 72 percent of the theoretical density of thoria which readily dissolves to greater than 95 percent with a standard test that measures dissolution in six hours' time by a boiling solution of concentrated nitric acid containing catalytic quantities of fluoride ion and small amount of aluminum.

It is, therefore, the principal object of this invention to provide a process for the production of thoria which meets the aforementioned requirements.

DISCUSSION OF THE PRIOR ART

Until recently, it had always been thought that the addition of an aqueous solution of alkali or ammonium hydroxide to a solution of a soluble thorium salt would produce a gelatinous, non-filterable precipitate of thorium hydroxide. However, a breakthrough in the technology of thoria production has recently been described in U.S. Pat. No. 3,370,016 to Gifford Briggs for a process for producing a filterable modified form of thorium hydroxide precipitate. In that patent it is shown that a filterable thorium hydroxide precipitate can be obtained if the precipitation of thorium nitrate by addition of ammonium hydroxide is accompanied by a simultaneous bubbling or sparging with carbon dioxide or by the equivalent operation of adding ammonium carbonate or bicarbonate to the aqueous thorium nitrate solution. The resulting precipitate which forms can be converted to a gelled thoria powder, having particles approaching the theoretical density of thoria and a spectrum of particle sizes which include an appreciable percentage which lie in the millimeter size range. While the chemical composition of the precipitate is not known, it is thought to consist of a gel considered to be essentially thorium hydroxide in which at least a portion of the hydroxyl radicals are replaced by nitrate, carbonate, and other anions. Once a filtered and dried thorium hydroxide gel is formed, it can be sized by crushing, milling, and screening procedures to isolate desired particle fractions and then fired at a temperature in the range 1100° to 1300° C. to produce particles of thoria approaching theoretical density. With a proper size distribution of the particles ranging from millimeter to micron sizes, high vibratorily compacted densities can be achieved. In order, however, to produce a thoria product which is dissolvable after considerable neutron irradiation necessary to produce uranium-233, the vibratorily compacted thoria particles produced by the Briggs process must be doped with sulfate additions of from 1000 to 6000 parts per million of thorium. Moreover, the over-all process is essentially a batch-type operation in which careful control of a varying pH must be monitored throughout the process of precipitation in order to produce a filterable precipitate. The present invention is similar in its product aspects to the invention disclosed in the aforementioned Briggs patent in that it produces vibratorily compactible thoria particles capable of ready dissolution in aqueous nitrate media, but is different in that it does not require the presence of sulfate to meet the necessary dissolution requirements. From a process point of view, the method of the present invention differs from the Briggs process in that it is capable of being operated on a continuous basis under essentially steady-state conditions to produce a filterable thorium hydroxide precipitate without the necessity of introducing carbon dioxide or a carbonate to induce nucleation of the precipitating particles.

SUMMARY OF THE INVENTION

The process of the present invention is predicated on the discovery of a set of process variables which permit the reaction of an aqueous solution of thorium nitrate with ammonium hydroxide to proceed on an essentially continuous, steady-state basis to produce a thorium hydroxide precipitate which can readily be converted to high density gel-type particles suitable for vibratory compaction.

It has previously been stated that the addition of a solution of alkali or ammonium hydroxide to a solution of a soluble thorium salt such as thorium nitrate would produce a non-filterable gelatinous precipitate of thorium hydroxide. The only exception to this generalization known in the prior art is found in the Briggs process as disclosed in the aforementioned U.S. patent. The second exception, as far as I am aware, is represented by the process of the present invention which allows the formation of a filterable thorium hydroxide precipitate under conditions which do not require the presence of carbon dioxide or a carbonate salt. Instead, the same result can be achieved in accordance with my invention by controlling the acidity, temperature, and retention time of the resultant mixture of thorium nitrate and ammonium hydroxide in an aqueous system within prescribed limits. The most essential requisite to the success of my invention depends on controlling the reaction mixture during precipitation so that the pH of the aqueous phase always corresponds to a pH as measured at room temperature ranging from 5.0 to 6.5. In actual practice, it should be understood that pH measurement and control are conducted at the reaction temperature (in the range 190–200° F.) so that any instrument pH reading must be calibrated as a function of temperature to correspond at all times to a room temperature pH in the prescribed range of from 5.0 to 6.5. Based on extensive and varying experimental conditions, I have found that a filterable thorium hydroxide precipitate can be continuously produced under the following parameters:

Room temperature pH—5.0–6.5
Temperature of reactants—180–200° F.
Thorium nitrate feed concentration—160–460 g./l. Th
Thorium nitrate feed $HNO_3$ concentration—0.5–1.5 N
Ammonium hydroxide concentration—2.0–7.5 N
Residence time of slurry—50–180 min.
Settling rate—20–200 in./hr.
Slurry thorium concentration—100–180 g./l. Th
Agitation—Vigorously without vortex The effect of varying the process parameters within the operating limits recited above will now be described in terms of process and product effects.

pH of precipitation: As the pH of the aqueous phase is increased, the settling rate increases and the filtration rate of the resulting slurry or precipitate increases. Also, at the upper operating limits of pH the dissolution rate of the resulting sintered gelled powder tends to drop slightly. As the pH decreases, the settling rate decreases, leading to a lower filtration rate but to a product having satisfactory dissolution properties. While precipitation of thorium hydroxide will occur at a pH below 5, the reaction is incomplete and tends to produce a slimy-type precipitate which may not filter. Precipitations carried out at a pH greater than 6.5 produce the dry-appearing, coarse-type precipitate which may not gel.

Feed concentration: An increase in thorium nitrate and ammonium hydroxide concentration will simply result in an increase in the thorium content of the precipitated slurry. No other effects were observed at different concentrations of either thorium nitrate or ammonium hydroxide solutions up to the limit of 180 g./l. thorium in the slurry tested.

Retention time: The retention time or residence time of the precipitated slurry in the chamber in which precipitation occurs appears to affect the filtration rate of the precipitate. Experience has shown that a residence time of at least 50 minutes is required to produce a satisfactory precipitate which can be filtered in a practical time and produce a uniform precipitate. In general, longer retention times improve the filtration rate of the slurry and therefore produce a more uniform precipitate.

Temperature of reactants: Other process variables and the properties of the product are not affected by conducting the precipitation at a temperature between 180° and 200° F. The lower limit of temperature is governed by the simple consideration that the reaction rate is not practically fast at lower temperatures. Temperatures above 200° F. should be avoided in order to reduce excess evaporation at atmospheric pressure.

Assuming a steady-state operation after a residence time of at least about 50 minutes, the resultant slurry produced in the precipitating tank can now be fed to the remaining operations which lead to its conversion to a glassy gel. The slurry is discharged from the precipitator into a settler cone which allows for bottom discharge of thickened slurry after a suitable settling time. The cone walls are approximately 45° and the total volume, including a short, straight wall section at the top of the cone, should be such as to serve as a surge tank at startup when the filtrating quality of the slurry is relatively low compared to the filtering quality under steady-state conditions. The settler underflow may conduct the resultant wet cake by gravity transfer to a filter.

As evidenced by the range of permissible conditions, it can be seen that many of the process variables such as temperature of reaction, thorium nitrate feed concentration, ammonium hydroxide concentration, and residence time of the slurry can be operated within fairly wide limits without affecting the quality of the resulting product.

The settling rate achieves an equilibrium in the range of 150–200 in./hr. Slurries with less than 20 in./hr. settling rate yield a filter cake which is slimy and tends to blind filter media; a 20–100 in./hr. settling rate gives a moist cake; and a settling rate in excess of 100 in./hr. produces a dry-appearing, flaky cake under the same filtration conditions. The moist cake filters most easily on a rotary vacuum filter. The dry cake with an $NH_4OH$ wash is suitable for forming a powdered form of $ThO_2$.

Conversion to glassy gel: At this point in the process, any user has a choice of producing either a mass of glassy gel particles suitable for vibratory compaction or conversion of the filter cake to a powder metallurgy grade thoria. To produce a glassy gel, the filter cake must be pugged with small amounts of nitric acid or thorium nitrate which will calcine to dense thoria particles which have the required dissolution quality. In order to produce the desired glassy gel, an amount of 3–10 ml. of 70-percent nitric acid is required for each pound of thorium in the filter cake. The filter cake is passed to a hot mixing tank where the required amount of nitrate is added. In the tank, the cake is heated to a temperature of from 100° to 175° F. with continuous mixing to form a liquid sol-type product. Alternatively, the cake can be pugged with nitric acid at ambient temperature and then transferred to a heated mixing tank.

The liquefied pugged filter cake is then in condition to be dried to a glassy gel product. The desired result for the dry gel is to produce a distribution of sizes of solid-glassy gel particles with the sizes going up to ¼ inch minimum dimension. The drying conditions will influence the final particle size. A desired maximum particle size can be achieved by varying the temperature and bed depth of the liquefied filter cake. It has been shown, for example, that a ¾-inch bed dried in 2 hours at 400° F. will not produce a satisfactory product, but a 1½-inch bed dried 2 hours at 650° F. will give satisfactory results. In general terms, it has been found that glassy gel particles with sizes going up to about 3/16 inch minimum dimension can be produced at a bed depth of 1½ to 2 inches at a temperature of from 500° to 600° F. over a drying cycle of 2 to 4 hours.

Treatment of the dried gel: The dried thorium hydroxide gel is now in condition to be converted to a compaction grade of thoria; i.e., a mixture of thorium oxide particles of various sizes selected such that, on vibration or jolting of the mixture, a minimum void volume between the particles will result. The individual particles themselves should preferably be free of cracks and large open or closed pores such that the particle density approaches the theoretical density of the thorium oxide lattice. In general, it is desirable when producing a compaction grade of thoria that the oxide be rendered available in a range of particle sizes from perhaps as coarse as that which would just pass a six-mesh to the inch sieve size to that which would just pass a 325-mesh to the inch sieve size.

The dried gel is converted to dense thorium oxide granules by heating to calcination temperatures in the range of 1100°–1300° C. During this process, some fracturing of the gel into smaller particles will take place and, as the temperature rises to about 1050° F., volatile matter consisting of water vapor, ammonium nitrate, and nitrogen oxides will be driven off, with the majority being removed by the time 600° F. is reached.

Once thoria particles covering a suitable spectrum of particle size and of near theoretical density have been produced, the thoria may be processed by methods well known in the state of the art to produce mixtures of particles which will pack to bulk densities exceeding at least 7.2 grams per cubic centimeter. In general, this will entail crushing and grinding of some or all of the calcined oxide particles and screening operations to separate out certain particle sizes. Various amounts of the sized fractions are then combined to yield the final desired mixture which will meet a specified bulk density on being compacted by vibratory or other mechanical means. To attain the very highest packing densities, it is usually desirable to eliminate oxide particles lying within certain particle size ranges. The particular particle size spectrum which will yield the desired packing density is usually determined on an empirical basis. Packing densities from 5.8 to 8.0 g./cc. can be attained as desired.

The density of the calcined gels as determined by mercury intrusion methods indicated that the calcined gel particles had densities ranging from 9.6 to in excess of 9.90 g./cc. More than 99 percent of material processed in accordance with the preceding description within the operating limits described could be dissolved in 6 hours under the standard dissolution test previously defined. The particular behavior of the continuously precipitated thorium hydroxide during drying to a gel differs greatly from that of the batch precipitated product produced according to the Briggs batch process. Whereas the batch material can be formed as a paste or a thixotropic liquid which remains firm as it loses water and shrinks to gel, the continuously produced thoria gel particles produced by my method change from a cream to an extremely low viscosity sol when heat is applied. During the drying cycle the sol develops a wrinkled crust overlying the liquid which constitutes a barrier to the conduction of heat from hot air moving over the surface to the underlying sol. To achieve satisfactory drying rates the sol must be heated to boiling by conduction of heat through the supporting surface of the drying tray.

In summary, I have described a method for converting a thorium nitrate solution to a highly densified gel particle which can readily be dissolved in concentrated nitric acid media. This continuous method of producing thoria is essentially a titration procedure conducted at steady-state conditions in which pH is the main process control parameter. In effect, thorium nitrate and ammonium hydroxide are fed into a chamber whose pH is controlled at all times at the reaction temperature within the range 5.0 to 6.5.

Conversion of thorium hydroxide precipitate to powder: It has been previously mentioned that the thorium hydroxide precipitate can be converted at the discretion of the user to several forms of thoria. The formation of a dense, glassy-type thoria particle has already been described. Now, if the user wishes to obtain a final thoria powder suitable for powder metallurgical applications or for conversion to thorium metal, the thorium hydroxide precipitate is carried through a different process route which does not require a pugging or, in effect, a peptizing reaction. Instead, the thorium hydroxide precipitate is washed with a 0.3 to 0.9 molar $NH_4OH$ solution at ambient temperature. Under these conditions, the wet cake of thorium hydroxide is converted to a product which, upon drying and subsequent calcination, produces a chalky white powder similar to the powder produced by the calcination of thorium oxalate. The resultant calcined thorium oxide powder is then easily converted to particle size ranges as required for making dense compacts. Further, it has been found a suitable thorium oxide for conversion to thorium metal by calcium reduction.

In final summary, I have defined a process for the conversion of thorium nitrate solutions to dense thoria particles suitable in one case for vibratory compaction and in another for powder metallurgical applications. The invention in the first instance depends upon the creation of a steady-state condition involving, in effect, a continuous titration reaction between an aqueous solution of thorium nitrate and an ammonium hydroxide solution in which the resultant mixture is carefully controlled to within prescribed and narrow limits of pH at the reaction temperature. Under these conditions, a filterable precipitate is formed to produce a filter cake which is amenable to conversion to either an exceedingly dense, glassy form or to a dense, chalky white, fine powder. The process is characterized by extreme simplicity, flexibility, and by ease of operation and provides a means of producing thoria powder in virtually all the required physical forms needed in the nuclear industry.

What is claimed is:

1. A method for preparing thoria from an aqueous solution of thorium nitrate which comprises adding an aqueous solution of ammonium hydroxide to said solution at a temperature in the range 180°–200° F. under such conditions that the pH of the resulting slurry as would be measured at 25° C. is at a value in the range 5.0–6.5 during continuous mixing of the resulting slurry for a period of time ranging from 50 to 180 minutes, allowing the resultant precipitate to settle at a rate in the range 20–200 in./hr. and then filtering the settled precipitate, peptizing the resultant filter cake, heating the resulting concentrated sol at a temperature in the range 100–175° F., and then forming a thin layer of said sol, heating said sol to form irregularly shaped glassy gel particles and then calcining said particles.

References Cited

UNITED STATES PATENTS

| | | | |
|---|---|---|---|
| 3,082,103 | 3/1963 | Wainer | 252—301.1 |
| 3,153,569 | 10/1964 | Duncan | 23—345 |
| 3,312,632 | 4/1967 | Smith | 23—355 |
| 3,330,772 | 7/1967 | Fitch et al. | 252—301.1 |
| 3,370,016 | 2/1968 | Briggs | 23—345 |
| 3,513,101 | 5/1970 | Meservey | 252—30.1 |

FOREIGN PATENTS 855,481  11/1960  Great Britain _____ 23—328

BENJAMIN R. PADGETT, Primary Examiner

F. M. GITTES, Assistant Examiner

U.S. Cl. X.R.

23—345; 252—301.1 S; 264—0.5